(12) United States Patent
Kitahara

(10) Patent No.: US 6,796,118 B2
(45) Date of Patent: Sep. 28, 2004

(54) EXHAUST GAS PURIFICATION SYSTEM AND METHOD FOR INTERNAL COMBUSTION ENGINE

(75) Inventor: Yasuhisa Kitahara, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/332,238

(22) PCT Filed: Jul. 26, 2002

(86) PCT No.: PCT/JP02/07577

§ 371 (c)(1),
(2), (4) Date: Jan. 6, 2003

(87) PCT Pub. No.: WO02/21192

PCT Pub. Date: Mar. 14, 2002

(65) Prior Publication Data

US 2004/0016227 A1 Jan. 29, 2004

(51) Int. Cl.[7] .............................................. F01N 3/00
(52) U.S. Cl. .............................. 60/285; 60/295; 60/301; 60/311
(58) Field of Search ........................ 60/285, 295, 301, 60/278, 297, 311

(56) References Cited

U.S. PATENT DOCUMENTS

| | | | | |
|---|---|---|---|---|
| 6,044,642 A | * | 4/2000 | Nishimura et al. | 60/285 |
| 6,058,701 A | * | 5/2000 | Mashiki | 60/285 |
| 6,131,388 A | * | 10/2000 | Sasaki et al. | 60/286 |
| 6,318,074 B1 | * | 11/2001 | Nishimura et al. | 60/284 |
| 6,330,796 B1 | * | 12/2001 | Nishimura et al. | 60/286 |
| 6,397,582 B1 | * | 6/2002 | Hanaoka et al. | 60/274 |
| 6,422,004 B1 | * | 7/2002 | Takami et al. | 60/285 |
| 6,434,929 B1 | * | 8/2002 | Nishimura et al. | 60/278 |
| 6,438,943 B1 | * | 8/2002 | Yamamoto et al. | 60/274 |
| 6,477,834 B1 | * | 11/2002 | Asanuma et al. | 60/295 |
| 6,588,205 B1 | * | 7/2003 | Kumagai et al. | 60/298 |
| 6,637,192 B2 | * | 10/2003 | Yamamoto et al. | 60/274 |
| 6,644,021 B2 | * | 11/2003 | Okada et al. | 60/286 |
| 6,658,840 B2 | * | 12/2003 | Iiyama et al. | 60/285 |

FOREIGN PATENT DOCUMENTS

| | | |
|---|---|---|
| DE | 43 33 424 A1 | 4/1994 |
| EP | 0 732 485 A2 | 9/1996 |
| EP | 1 085 176 A2 | 3/2001 |
| EP | 1 128 051 A2 | 8/2001 |
| JP | 2864896 B2 | 12/1998 |
| JP | 3079933 B2 | 6/2000 |

* cited by examiner

*Primary Examiner*—Thomas Denion
*Assistant Examiner*—Diem Tran
(74) *Attorney, Agent, or Firm*—Foley & Lardner LLP

(57) ABSTRACT

An exhaust gas purification system for an internal combustion engine (1) is provided which comprises a Nox trap catalyst (13) and an air/fuel ratio controller (20) for controlling the exhaust gas purification system so that an exhaust air/fuel ratio is made rich in a premix combustion mode when it is the time for purifying trapped NOx of the NOx trap catalyst and the NOx trap catalyst is activated (S13) and that the exhaust air/fuel ratio is made rich in a diffusion combustion mode when it is the time for purifying trapped NOx of the Nox trap catalyst and the Nox trap catalyst is not activated (S15). An exhaust gas purification method is also provided.

34 Claims, 8 Drawing Sheets

TARGET INTAKE AIR QUANTITY AT RICH OPERATION IN PREMIX COMBUSTION

TARGET EGR RATIO AT RICH OPERATION IN PREMIX COMBUSTION

TARGET INTAKE AIR QUANTITY AT RICH
OPERATION IN DIFFUSION COMBUSTION

TARGET DPF INLET $\lambda$ FOR
PM COMBUSTION

EXHAUST GAS PURIFICATION SYSTEM AND METHOD FOR INTERNAL COMBUSTION ENGINE

BACKGROUND OF THE INVENTION

The present invention relates to an exhaust gas purification system for an internal combustion engine, particularly of the kind having a NOx trap catalyst that traps NOx in an exhaust gas when an exhaust air/fuel ratio is lean and releases the trapped NOx when the exhaust air/fuel ratio is rich, thereby purifying the exhaust gas. The present invention further relates to an exhaust gas purification method for an internal combustion engine.

In the diesel engine, when injection of fuel into a cylinder is started, injected fuel is vaporized and formed into a mixture. The mixture that exists within the cylinder when the temperature and pressure within the cylinder reach predetermined values performs an initial combustion (premix combustion). By this combustion, the temperature and pressure within the cylinder become high, so that after the initial combustion the injected fuel is vaporized and burnt (diffusion combustion) simultaneously with the injection. Since the period (ignition delay period) from start of fuel injection to occurrence of the premix combustion is generally short with respect to the entire combustion period, the diffusion combustion is a main combustion.

In contrast to this, Japanese Patent 2864896 discloses a technique for holding down the combustion temperature to low by increasing the EGR rate considerably, while retarding the fuel injection timing to a point after the top dead center thereby making an ignition delay period considerably longer and allowing all the quantity of fuel to be injected within the ignition delay period for allowing a premix combustion to serve as a main combustion, thereby reducing the NOx and smoke in the exhaust gas.

In the meantime, a combustion condition wherein a main combustion is a diffusion combustion (this is herein referred to simply as diffusion combustion or diffusion combustion mode) and a combustion mode wherein a main combustion is a premix combustion (this is herein referred to simply as premix combustion or premix combustion mode) are generally switched from one to another depending upon a driving condition (for example, in FIG. 8, a zone with EGR corresponds to a premix combustion zone and a zone without EGR corresponds to a diffusion combustion zone).

On the other hand, Japanese Patent 3079933 discloses that in case an exhaust passage is provided with a NOx trap catalyst and at the time for purifying the trapped NOx, the combustion mode of the diesel engine is switched from the diffusion combustion mode to the premix combustion mode thereby lowering the excess air rate and reducing and purifying the trapped NOx.

SUMMARY OF THE INVENTION

The technique disclosed by Japanese Patent 3079933 is adapted to execute a rich spike control during the premix combustion at the time of purification of NOx trapped in the NOx trap catalyst. However, the technique has a problem that even when the exhaust air/fuel ratio is made rich when the vehicle is in a low-load running condition, a sufficient exhaust purification effect by the rich spike control cannot be attained since the exhaust gas temperature remains low and the low exhaust gas temperature causes the NOx purifying efficiency to be maintained low, i.e., the catalyst is not sufficiently activated.

It is accordingly an object of the present invention to provide an exhaust gas purification system for an internal combustion engine that can attain an improved exhaust gas purifying ability by executing purification of trapped NOx of the NOx trap catalyst depending upon an activated condition of the NOx trap catalyst.

It is a further object of the present invention to provide an exhaust gas purification system that is executed by the exhaust gas purification system of the foregoing character.

According to an aspect of the present invention, there is provided an exhaust gas purification system for an internal combustion engine including a NOx trap catalyst disposed in an exhaust passage of the engine for trapping NOx in an inflow exhaust gas when an air/fuel ratio of the exhaust gas is lean and releasing trapped NOx when the air/fuel ratio of the exhaust gas is rich, and a control unit for controlling the NOx trap catalyst in accordance with an activated condition of the NOx trap catalyst, the control unit comprising a purification time determining section for determining whether it is the time for purifying NOx trapped by the NOx trap catalyst, a catalyst activation determining section for determining whether the Nox trap catalyst is activated, a combustion mode switching section for switching a combustion mode of the engine between a diffusion combustion mode and a premix combustion mode in accordance with an operating condition of the engine, and an air/fuel ratio control section for controlling an exhaust air/fuel ratio so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not activate.

According to another aspect of the present invention, there is provided an exhaust gas purification method for an internal combustion engine having a NOx trap catalyst disposed in an exhaust passage for trapping NOx in an inflow exhaust gas when an air/fuel ratio of the exhaust gas is lean and releasing trapped NOx when the air/fuel ratio of the exhaust gas is rich, the exhaust gas purification method comprising determining whether it is the time for purifying NOx trapped by the NOx trap catalyst, determining whether the Nox trap catalyst is activated, switching a combustion mode of the engine between a diffusion combustion mode and a premix combustion mode in accordance with an operating condition of the engine, and controlling an exhaust air/fuel ratio so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not activated.

According to a further aspect of the present invention, there is provided an exhaust gas purification system for an internal combustion engine comprising a NOx trap catalyst disposed in an exhaust passage of the engine for trapping NOx in an inflow exhaust gas when an air/fuel ratio of the exhaust gas is lean and releasing trapped NOx when the air/fuel ratio of the exhaust gas is rich, purification time determining means for determining whether it is the time for purifying NOx trapped by the NOx trap catalyst, catalyst activation determining means for determining whether the Nox trap catalyst is activated, combustion mode switching means for switching a combustion mode of the engine between a diffusion combustion mode and a premix combustion mode, and air/fuel ratio control means for controlling so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not activated.

DSETAILED DESCRIPTION OF THE INVENTION

Figure 1:
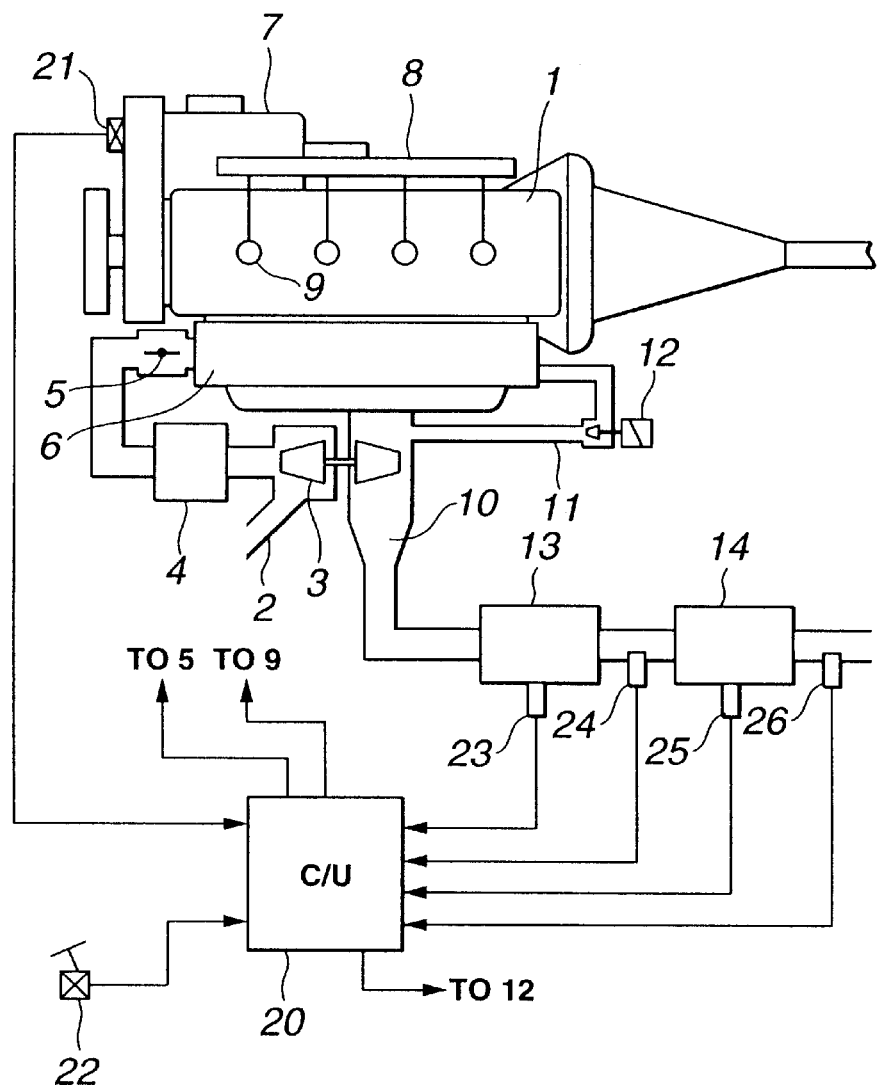
FIG. 1 is a block diagram of a diesel engine having an exhaust gas purification system according to an embodiment of the present invention.

Referring to FIG. 1, intake air supplied into diesel engine 1 by way of intake pipe 2 is supercharged by an intake air compressor of variable nozzle type turbocharger 3. The intake air is cooled by intercooler 4 and then flows through intake throttle valve 5 and collector 6 into a combustion chamber of each cylinder. Fuel is pressurized by high pressure fuel pump 7 and conveyed to common rail 8. Then, the fuel is injected from fuel injector 9 at each cylinder into the combustion chamber. A mixture of air and fuel thus supplied into the combustion chamber is burnt by compression ignition and an exhaust gas is emitted through exhaust passage 10.

A portion of the exhaust gas having flown into exhaust passage 10 is caused to flow back to an intake side through EGR pipe 11 and by way of EGR control valve 12. The remainder of the exhaust gas is caused to pass an exhaust turbine of variable nozzle type turbocharger 3 to drive the exhaust turbine.

In this instance, disposed downstream of the exhaust turbine for purification of the exhaust gas is NOx trap catalyst 13 that traps NOx in the exhaust gas when the exhaust air/fuel ratio is lean and discharges or reduces NOx when the exhaust air-fuel ratio is rich. Further, NOx trap catalyst 13 carries thereon an oxidation catalyst so as to have a function of oxidizing HC and CO in the exhaust gas, thus being adapted to serve as a NOx trap catalyst with an oxidation function.

Further, disposed downstream of NOx trap catalyst 13 is diesel particulate filter (DPF) 14 for scavenging particular matter (PM) in the exhaust gas. Further, DPF 14 carries thereon three way catalyst so as to have a function of oxidizing HC and CO in the exhaust gas and a function of reducing NOx in the exhaust gas, thus being adapted to constitute a DPF with a three way catalytic function.

Inputted to control unit 20 are signals from engine speed sensor 21 for detecting engine speed Ne, accelerator opening degree sensor 22 for detecting accelerator opening degree APO, etc. for controlling engine 1.

Further, in this embodiment, there are provided catalyst temperature sensor 23 for detecting the temperature (catalyst temperature) of NOx trap catalyst 13, exhaust pressure sensor 24 for detecting the exhaust pressure at an inlet side of DPF 14 in exhaust passage 10, DPF temperature sensor 25 for detecting the temperature (DPF temperature) of DPF 14 and oxygen concentration sensor 26 for detecting an oxygen concentration at an outlet side of DPF 14 in exhaust passage 10. Signals from those sensors are also inputted to control unit 20. However, the temperature of NOx trap catalyst 13 and the temperature of DPF 14 can be detected by detecting the temperature of the exhaust gas present adjacent NOx trap catalyst 13 and DPF 14.

Based on those signals, control unit 20 outputs to fuel injector 9 a fuel injection command signal for controlling a fuel injection quantity for a main injection and a pilot injection prior to the main injection and fuel injection timing of fuel injector 9, to intake throttle valve a opening degree command signal, to EGR control valve 12 a opening degree command signal, etc.

The exhaust gas purification system of this embodiment is adapted to execute an exhaust gas purification control for releasing NOx trapped by and accumulated on NOx trap catalyst, burning thereby removing sulfur (S) accumulated on NOx trap catalyst13 due to S-poisoning (removal of S-poisoning), and burning thereby removing PM scavenged by DPF 14 (recovery of DPF). The exhaust gas purification control will be described in detail hereinafter.

Figure 2:
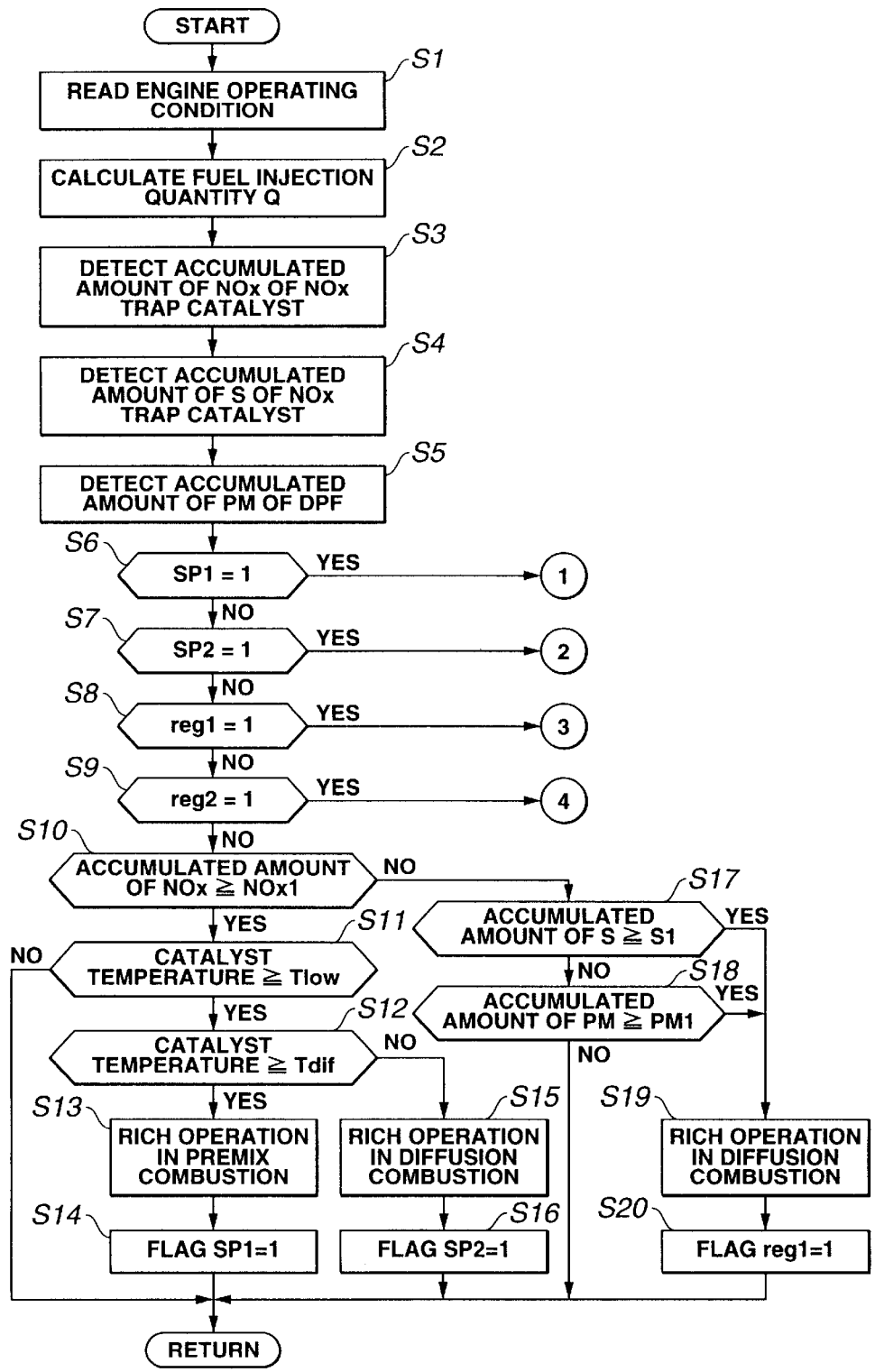
FIG. 2 is a flowchart of an exhaust gas purification control executed by the exhaust gas purification system of FIG. 1.
Figure 3:
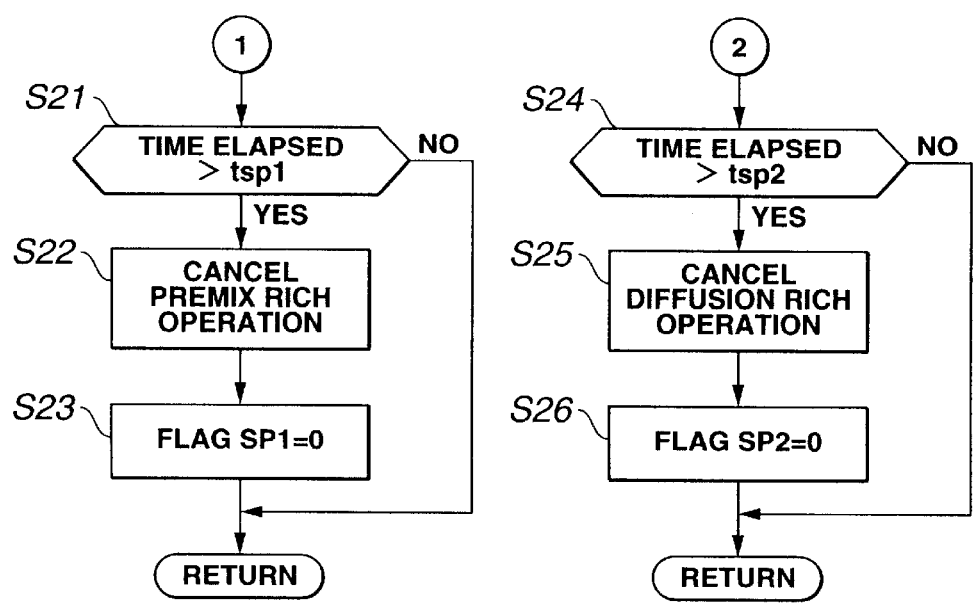
FIG. 3 is a flowchart of an exhaust gas purification control continued from FIG. 2.
Figure 4:
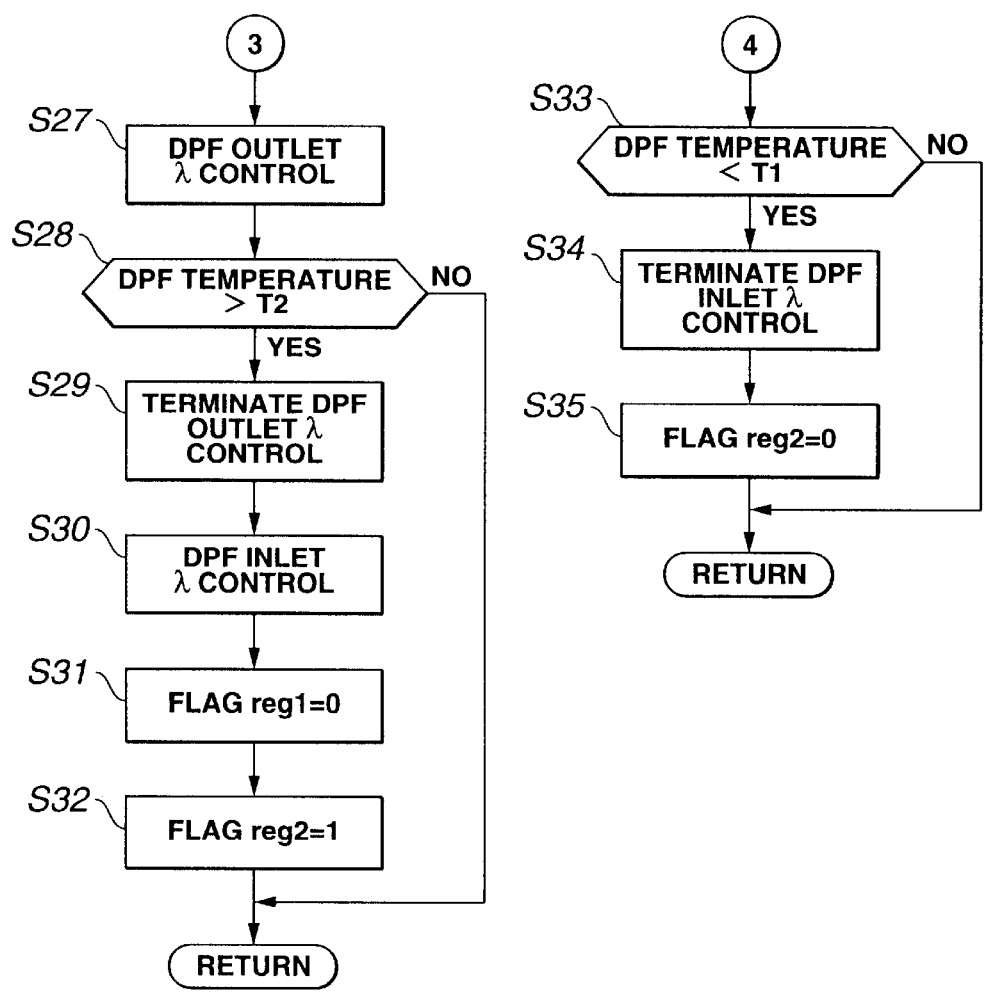
FIG. 4 is a flowchart of an exhaust gas purification control continued from FIG. 2.

FIGS. 2 to 4 show a flowchart of an exhaust gas purification control that is executed in control unit 20.

In step S1, an engine operating condition (engine speed Ne and accelerator opening degree APO) is read from engine speed sensor 21 and accelerator opening degree sensor 22.

In step S2, the amount of NOx trapped by and accumulated on NOx trap catalyst 13 is detected. However, since it is difficult to detect the accumulated amount of NOx directly, the accumulated amount of NOx is detected indirectly by estimating the generated amount of NOx per unit time on the basis of engine speed Ne and fuel injection quantity Q, obtaining the accumulated amount of NOx per unit time on consideration of an NOx trapping rate and summing up the accumulated amount of NOx per unit time. Of course, in case the accumulated amount of NOx is obtained by summing up in the above-described manner, the summed up value is reset or cleared when the NOx purification process that will be described hereinafter is executed.

In step S4, the accumulated amount of sulfur on NOx trap catalyst 13 due to S-poisoning is detected. However, it is difficult to detect the accumulated amount of sulfur directly, the accumulated amount of sulfur is detected indirectly in the following manner. The accumulated amount of sulfur is determined depending upon the concentration of sulfur in the exhaust gas. Thus, it is considered that the accumulated amount of sulfur can be determined depending upon the fuel consumption, provided that fuel is the same. Accordingly, the fuel consumption is detected and the accumulated amount of sulfur can be estimated based on the fuel consumption. Further, since the travel distance increases with increase of the consumed amount of fuel, the consumed amount of fuel and the travel distance can be considered equivalent to each other. Accordingly, the accumulated amount of sulfur is herein estimated depending upon the travel distance.

In step S5, the amount of PM scavenged by and accumulated on DPF 14 is detected. However, since it is difficult to detect the accumulated amount of PM directly, the accumulated amount of PM is detected indirectly in the following manner. Increase of the accumulated amount of PM on DPF 14 naturally causes the upstream side exhaust pressure of DPF 14 to become higher. Accordingly, the upstream side exhaust pressure of DPF 14 is detected by exhaust pressure sensor 24 and compared with the reference exhaust pressure at the present operating condition (engine speed Ne and fuel injection quantity Q) thereby estimating the accumulated amount of PM.

In step S6, it is determined whether premix rich spike condition flag SP1 for NOx purification of NOx trap catalyst 13 is set to 1. If SP1=1, the program proceeds to step S7.

In step S7, it is determined whether diffusion rich spike condition flag SP2 for NOx purification of NOx trap catalyst 13 is set to 1. If SP2=0, the program proceeds to step S8.

In step S8, it is determined whether recovery temperature rise flag reg1 for recovery of DPF 14 (or release of NOx trap catalyst 13 from S-poisoning) is set to 1. If reg1=0, the program proceeds to step S9.

In step S9, it is determined whether recovery combustion flag reg2 for recovery of DPF 14 (or release from S-poisoning of NOx trap catalyst) is set to 1. If reg2=0, the program proceeds to step 10.

In step S10, it is determined whether the accumulated amount of NOx of NOx trap catalyst 13 is equal to or larger than a predetermined value NOx1. If the accumulated amount of NOx of NOx trap catalyst 13 is smaller than the predetermined value NOx1, the program proceeds to step S17.

In step S17, it is determined whether the accumulated amount of sulfur of NOx trap catalyst 13 that is detected in step S4 becomes equal to or larger than a predetermined value S1 (whether the vehicle has traveled a predetermined distance). If the accumulated amount of sulfur of NOx trap catalyst is smaller than the predetermined value S1, the program proceeds to step S18.

In step S18, it is determined whether the accumulated amount of PM of DPF 14 that is detected at step S5 becomes equal to a predetermined value PM1 (whether the upstream side exhaust pressure of DPF 14 exceeds an exhaust pressure threshold value that corresponds to the present engine operating condition). If the accumulated amount of PM of DPF 14 is smaller than the predetermined value PM1, this flow is ended.

Figure 8:
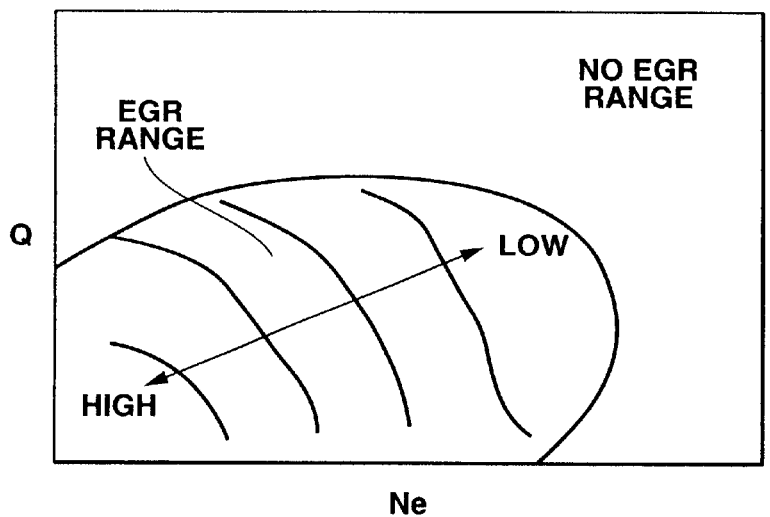
FIG. 8 is a diagram showing a target EGR rate at rich operation in a premix combustion.

In the meantime, if any particular control is not executed by this flow, switching between a diffusion combustion mode and a premix combustion mode is performed in accordance with an operating condition of engine 1. Specifically, as shown in FIG. 8, a premix combustion is performed when engine 1 is in the low to middle speed and low to middle load range where EGR is executed and a diffusion combustion is performed in the high-speed high-load range where EGR is not executed.

Then, description is made as to the case where it is determined in step S10 that the accumulated amount of NOx of NOx trap catalyst 13 has become equal to or larger than the predetermined value NOx1 (i.e., the time for purification of NOx of NOx trap catalyst 13 has come), the case where it is determined in step S17 that the accumulated amount of sulfur of NOx trap catalyst 13 has become equal to or larger than the predetermined value S1 (i.e., the time for release from S-poisoning has come), and the case where it is determined in step S18 that the accumulated amount of PM of DPF 14 has become equal to or larger than the predetermined value PM1 (i.e., the time for recovery of DPF has come).

[In Case it is the Time for NOx Purification of NOx Trap Catalyst]

If it is determined in step S10 that the accumulated value of NOx of Nox trap catalyst 13 is equal to or larger than the predetermined value NOx1, the program proceeds to step S11 for purifying NOx of NOx trap catalyst 13.

Herein, description is first made as to purification of NOx of NOx trap catalyst.

For NOx purification of NOx trap catalyst 13, a rich operation of engine 1 is executed to release NOx trapped by and accumulated on NOx trap catalyst 13.

Figure 5:
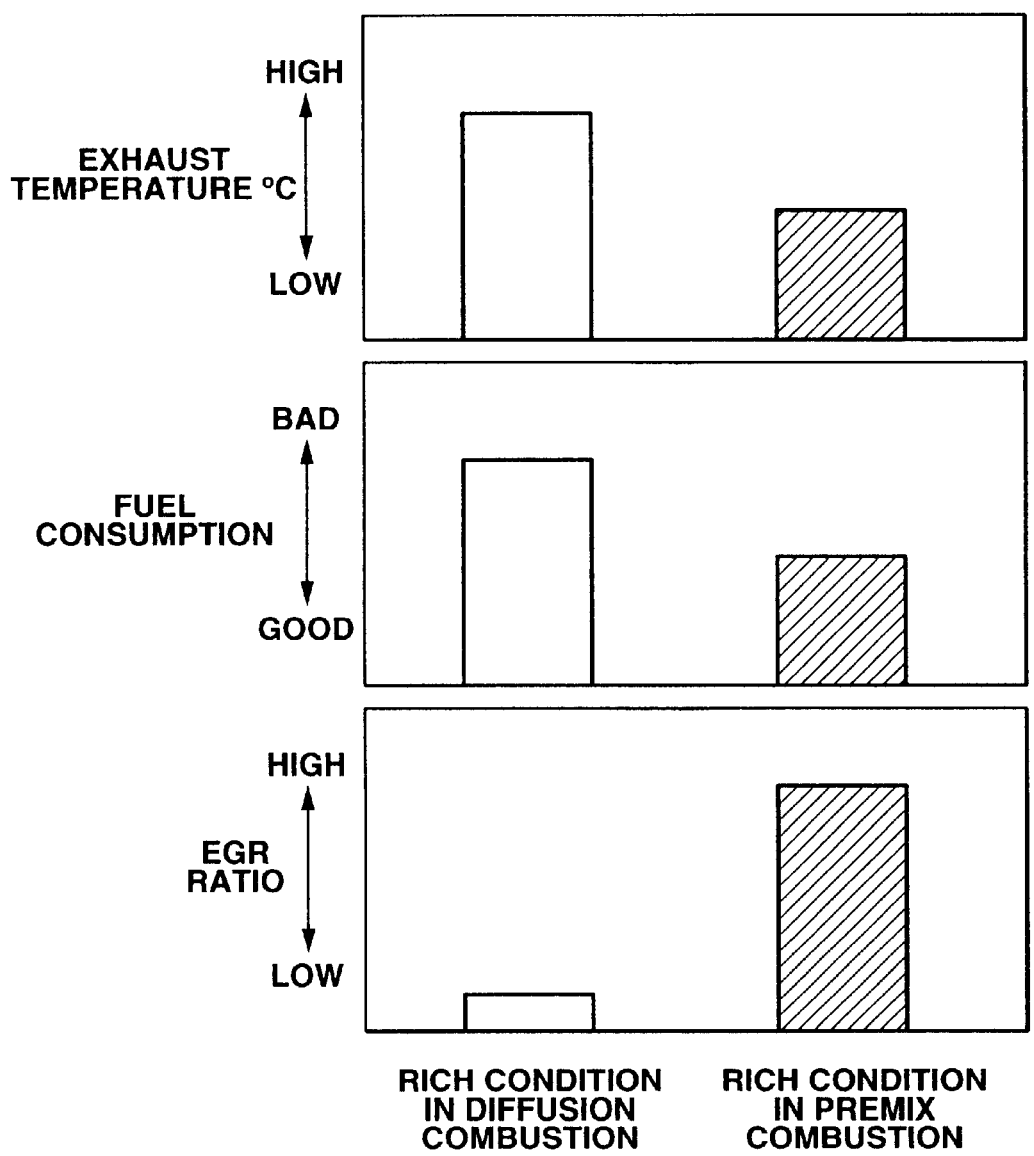
FIG. 5 is a diagram showing performance characteristics of an engine when combustion is in a rich condition in a diffusion combustion and in a rich condition in a premix combustion.

If a rich operation of engine 1 is executed during the premix combustion (large amount of EGR and high swirl), the exhaust temperature is lower as compared with that at a rich operation during the diffusion combustion where the ignition delay period is short, as shown in FIG. 5. Conversely speaking, if a rich condition in the diffusion combustion is realized, the exhaust temperature can be made higher as compared with that in the rich condition in the premix combustion.

However, the rich condition in the diffusion combustion increases the fuel consumption ratio, thus deteriorating the fuel consumption. Further, NOx trap catalyst 13 may crack if heated excessively, thus being deteriorated in the trapping and purifying ability.

Accordingly, for purification of NOx trapped by NOx trap catalyst 13 when the activity of catalyst 13 is sufficiently high, a rich spike operation in the premix combustion is preferred since it can suppress deterioration of fuel consumption and catalyst 13.

In contrast to this, if there is a rich spike command when the activity of catalyst 13 is low, a rich spike operation in the diffusion combustion that can attain a higher exhaust temperature is executed. This makes it possible to improve the NOx purification ratio. However, there is apprehension that a rich spike in the diffusion combustion causes deteriorated combustion noise. The combustion noise can be suppressed by performing pilot injection.

On the condition described above, a control in step S11 onward will be executed.

In step S11, the catalyst temperature detected by catalyst temperature sensor 23 is read and it is determined whether the catalyst temperature is equal to or higher than a predetermined temperature Tlow that is set at a value lower than an activation temperature of catalyst 13.

In step S12, it is further determined, when the catalyst temperature is equal to or higher than the predetermined temperature Tlow, whether the catalyst temperature is equal to or higher than a predetermined temperature Tdif that corresponds to the activation temperature of NOx trap catalyst 13.

By this, cases are divided into three, i.e., a case where the catalyst temperature≧Tdif, a case where Tlow≦the catalyst temperature<Tdif and a case where the catalyst temperature<Tlow.

Figure 6:
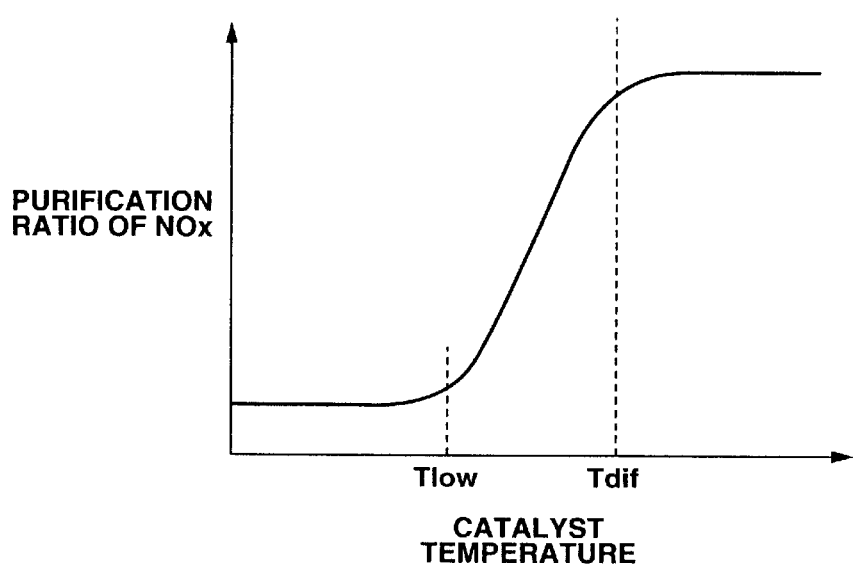
FIG. 6 is a diagram showing a relation between exhaust gas temperature and NOx purification ratio.

In this instance, as shown in FIG. 6, the purification ratio of NOx of NOx trap catalyst 13 is sufficiently large when the catalyst temperature is in the range higher than Tdif. However, the purification ratio of NOx becomes lower when the catalyst temperature becomes lower than Tdif and becomes further lower to such an extend that purification of NOx cannot be expected when the catalyst temperature becomes lower than Tlow.

Accordingly, if the catalyst temperature≧Tdif (i.e., when the determination in step S12 is affirmative), it is determined that NOx trap catalyst 13 is in a sufficiently activated state and the program proceeds to step S13. In step S13, a rich operation is executed in the premix combustion thereby purifying NOx while preventing a deterioration of fuel consumption and catalyst.

Figure 7:
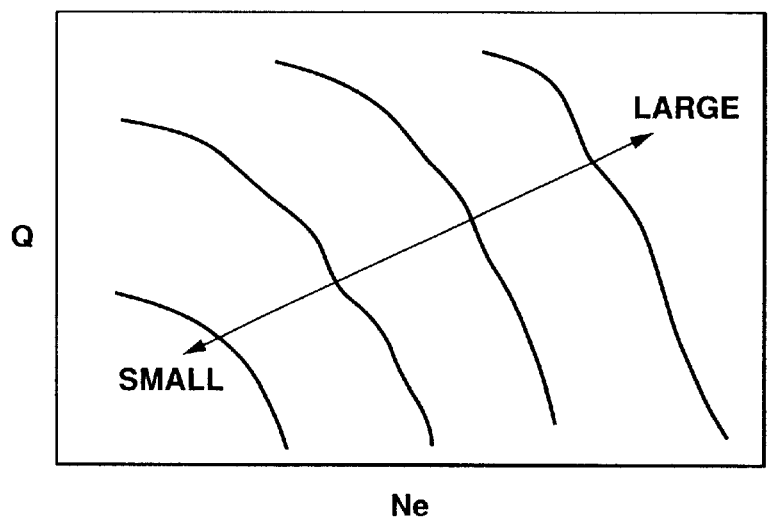
FIG. 7 is a diagram showing a target intake air quantity at rich operation in a premix combustion.

In this instance, in step S13, a target intake air quantity and target EGR ratio for realizing a rich operation in the premix combustion are set by using engine speed Ne and fuel injection quantity Q as parameters of an engine operating condition and by making reference to the target intake air quantity map of FIG. 7 and the target EGR map of FIG. 8. Based on the thus set target intake air quantity and target EGR ratio, intake throttle valve 15 and EGR control valve 12 are controlled thereby realizing a rich operation in the premix combustion. In step S14, premix rich spike condition flag SP1 is set to 1 and this flow is ended.

Further, if Tlow≦catalyst temperature<Tdif (i.e., when the determination in step S12 is negative), it is determined that NOx trap catalyst 13 is not in a sufficiently activated state, and the program proceeds to step S15. In step S15, a rich operation is executed in the diffusion combustion that is higher in exhaust temperature than the premix combustion. This causes the exhaust temperature to rise up to a value equal to or higher than Tdif, thus making it possible execute to execute a rich spike operation thereby improving the NOx purification ratio.

Figure 9:
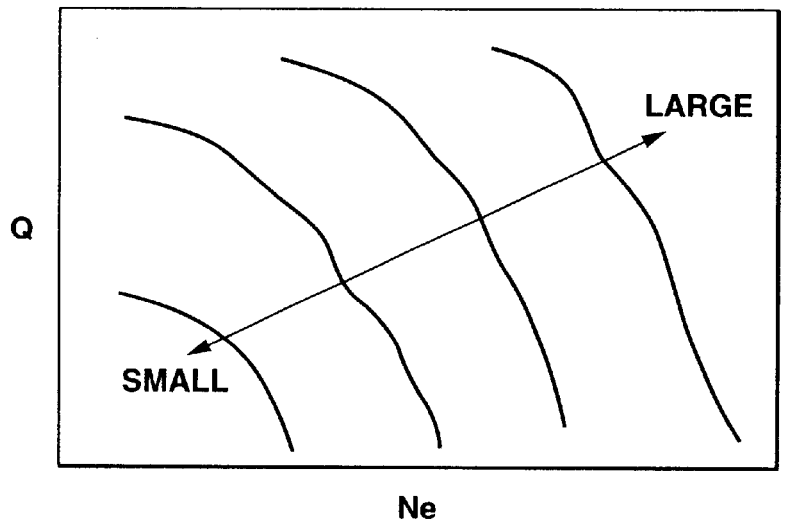
FIG. 9 is a diagram showing a target intake air quantity at rich operation in a diffusion combustion.

In this instance, in step S15, a target intake air quantity is set by reference to the target intake air quantity map of FIG. 9 for realizing a rich operation in the diffusion combustion. Based on the thus set target intake air quantity, intake throttle valve 5 is controlled while at the same time a pilot injection is executed by fuel injector 9, thereby realizing a rich operation in the diffusion combustion. In step S16, diffusion rich spike condition flag SP2 is set to 1, and this flow is ended.

Further, if catalyst temperature<Tlow (i.e., when the determination in step S11 is negative), this flow is ended. In this instance, since the activated condition of NOx trap catalyst 13 is bad so that it is difficult to elevate the catalyst temperature beyond Tdif even if a rich operation in the diffusion combustion is executed, i.e., a rich spike operation under the condition of Tlow≦catalyst temperature<Tdif has little effect on the purification of NOx, a rich spike operation is not executed and emission of NOx is suppressed only by the premix combustion. The exhaust temperature at the time of the premix combustion ranges from Tlow to Tdif with exceptions so that during the time the premix combustion is continued the catalyst temperature becomes higher to exceed Tlow.

In case a rich operation in the premix combustion is started (S13), premix rich spike condition flag SP1 is set to 1 in step S14. Thus, from the next time, after the determination in step S6, the program proceeds to step S21 onward (FIG. 3) where a rich operation in the premix combustion is continued for a predetermined time.

In step S21, it is determined whether a predetermined time tsp1 necessary for NOx purification has elapsed or not. If predetermined time tsp1 has not yet elapsed, this flow is ended at once. If predetermined time tsp1 has elapsed, the rich operation in the premix combustion is cancelled in step S22 and premix rich spike condition flag sp1 is set to 0 in step S23. Thereafter, this flow is ended.

Further, in case a rich operation in the diffusion combustion is started (S15), diffusion rich condition flag SP2 is set to 1 in step S16. Thus, from the next time, after the determination in step S7, the program proceeds to step S24 onward (FIG. 3) where a rich operation in the diffusion combustion is continued for a predetermined time.

In step S24, it is determined whether predetermined time tsp2 necessary for NOx purification has elapsed. If predetermined time tsp2 has not yet elapsed, this flow is ended at once. If predetermined time tsp2 has elapsed, the rich operation in the diffusion combustion is cancelled in step S25 and diffusion rich spike condition flag sp2 is set to 0 in step S26. Thereafter, this flow is ended.

[When it is the Time for Recovery from S-poisoning] and [When it is the Time for Recovery of DPF]

If it is determined in step S17 that the accumulated amount of sulfur of NOx trap catalyst 13 is equal to or larger than a predetermined value S1, the program proceeds to step S19 and step S20 for recovery from S-poisoning.

If it is determined in step S18 that the accumulated amount of PM of DPF 14 is equal to or larger than a predetermined value PM1, the program proceeds to step S19 and step S20 for recovery of DPF 14.

Herein, description is first made as to recovery of DPF 14 and recovery of NOx trap catalyst from S-poisoning.

For recovery of DPF and recovery from S-poisoning, a rich operation is executed so as to elevate the exhaust temperature thereby elevating the temperature of DPF 14 above a combustible temperature of PM. In the meantime, a combustible temperature of sulfur is lower than the combustible temperature of PM. Further, since in this embodiment NOx trap catalyst 13 on which sulfur is accumulated is located upstream of DPF 14, recovery of NOx trap catalyst 13 from S-poisoning can be attained by elevating the temperature of DPF 14 above the combustible temperature of PM.

If a rich operation is executed in the premix combustion (large amount of EGR+high swirl), the resulting exhaust temperature is lower as compared with that in a rich condition in diffusion combustion whose ignition delay period is short, due to specific heat, etc. of working gas provided by EGR. In other words, if a rich condition is realized during the diffusion combustion, a higher exhaust temperature can be attained as compared with that in the rich condition in the premix combustion.

Since a high exhaust temperature (i.e., >600° C.) is required for recovery of DPF 14 and recovery of NOx trap catalyst from S-poisoning, it is desirable to elevate the temperature of DPF 14 by a rich condition in the diffusion combustion by which a higher exhaust temperature can be expected. However, if a rich spike control is executed during the diffusion combustion, there is an apprehension that a combustion noise is deteriorated. The combustion noise can be suppressed by executing pilot injection.

Accordingly, in step S19, since it has already been determined that it is the time for recovery of DPF 14 or for recovery of NOx trap catalyst 13 from S-poisoning, a rich operation in the diffusion combustion by which a higher exhaust temperature can be expected is executed with a view to elevating the temperature of DPF 14 above the combustible temperature of PM. Also in this instance, pilot injection is executed.

Then, in step S20, recovery temperature rise flag reg1 is set to 1, and this flow is ended.

By this, from the next time, since it is determined in step S8 that reg1=1, the program proceeds to step S27 onward.

In step S27, when the temperature of DPF 14 is elevated by a rich condition in the diffusion combustion, the oxygen concentration at the outlet of DPF 14, i.e., the exhaust air/fuel ratio (DPF outlet λ) is detected by oxygen concentration sensor 26 and intake throttle valve 5 is controlled so that the exhaust air/fuel ratio becomes stoichiometric. In this instance, if DPF 14 carries thereon a three-way catalyst, a three-way catalytic function can be realized by controlling so that the DPF outlet λ becomes stoichiometric, thus making it possible to continue purification of exhaust gas even during elevation of the temperature of DPF 14.

In step S28, the temperature of DPF 14 detected by DPF temperature sensor 25 is read and it is determined whether the temperature of DPF 14 exceeds a combustible temperature T2 of PM.

If the temperature of DPF 14 has not yet exceeded T2, this flow is ended at once and the rich operation in the diffusion combustion under the DPF outlet λ control is continued. If the temperature of DPF 14 exceeds T2, the program proceeds to step S29.

In step S29, since the temperature of DPF 14 has reached temperature T2 for allowing PM to be combustible, the DPF outlet λ control is ended.

Figure 10:
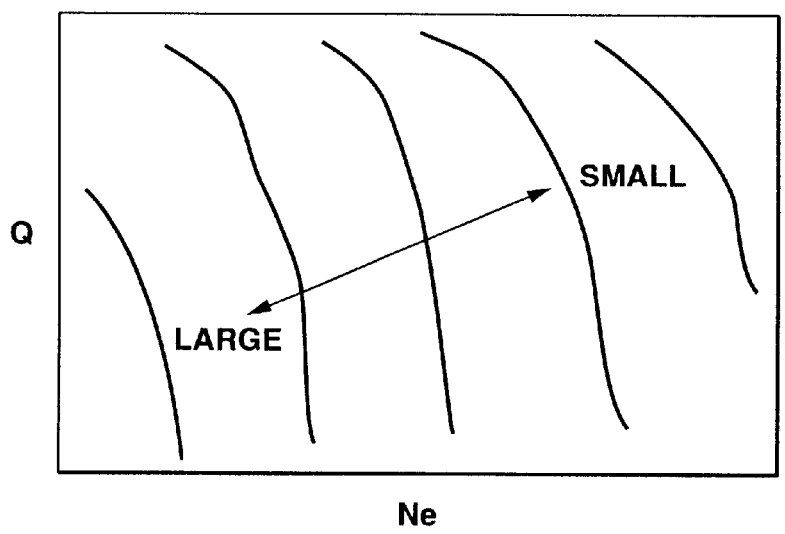
FIG. 10 is a diagram showing a target DPF inlet λ for PM combustion.

In step S30, the exhaust air/fuel ratio at the inlet of DPF 14 (DPF inlet λ) is started. Namely, as shown in FIG. 10, by reference to a map that uses engine speed Ne and fuel injection quantity Q as parameters of an engine operating condition and defines target DPF inlet λ for burning thereby removing PM, intake throttle valve 15 is controlled so as to obtain the target DPF inlet λ thereby supplying a predetermined amount of oxygen to DPF 14 and burning out the PM accumulated on DPF 14. Since the temperature of DPF 14 has already reached the combustible temperature of PM, supply of oxygen to DPF 14 causes the PM accumulated on DPF 14 to burn all at once. In the meantime, since by controlling the DPF inlet λ the combustion speed of PM can be controlled, thus making it possible to prevent melting and burning of DPF 14.

In step S31, since DPF 14 has been out of the recovery temperature rise condition, the recovery temperature rise flag reg1 is set to 0.

In step S32, since DPF 14 has been in a recovery combustion condition, recovery combustion flag reg2 is set to 1 and this flow is ended.

By this, from the next time, since it has been determined in step S9 that reg2=1, the program proceeds to step S33 (FIG. 4).

In step S33, the temperature of DPF 14 detected by DPF temperature sensor 25 is read and it is determined whether the temperature of DPF 14 is lower than temperature T1 that does not cause abnormal burning since combustion of PM at DPF 14 has been almost finished.

If the temperature of DPF 14 has not yet fallen to T1, this flow is ended at once and the DPF inlet λ control is continued. This is because due to the possibility of abnormal combustion, it is necessitated to continue the DPF inlet λ control thereby holding the DPF inlet λ at a predetermined value until the temperature of DPF 14 is lowered beyond temperature T1.

If the temperature of DPF 14 has fallen beyond T1, the program proceeds to step S34.

In step S34, the DPF inlet λ control is ended.

In step S35, since DPF 14 has been out of the recovery combustion condition, the recovery combustion flag reg2 is set to 0 and this flow is ended.

In the foregoing, it is to be noted that step S11 of the program stored in control unit 20 corresponds to a purification time determining section for determining whether it is the time for purifying NOx trapped by NOx trap catalyst 13.

It is further to be noted that step S12 of the program stored in control unit 20 corresponds to an activated condition determining section for determining an activated condition of NOx trap catalyst 13.

It is further to be noted that steps S13 and S15 of the program stored in control unit 20 constitute an air/fuel ratio control section for controlling an exhaust air/fuel ratio for purifying trapped NOx of NOx trap catalyst 13 and a combustion mode switching section for switching a combustion mode of engine 1.

It is further to be noted that step S18 of the program stored in control unit 20 constitutes a recovery time determining section for determining whether it is the time for executing recovery of DPF 14.

It is further to be noted that step S17 of the program stored in control unit 20 corresponds to a S-poisoning recovery time determining for determining whether it is the time for executing recovery of Nox trap catalyst from S-poisoning.

It is further to be noted that step 19 of the program stored in control unit 20 corresponds to an air/fuel ratio control section for controlling an exhaust air/fuel ratio for recovery of NOx trap catalyst 13 from S-poisoning.

From the foregoing, it will be understood that when trapped NOx of NOx trap catalyst 13 is to be purified and the activity of catalyst 13 is low due to a low exhaust temperature, a rich operation is executed in a diffusion combustion mode thereby causing the exhaust temperature to rise sharply and catalyst 13 to be activated, thus making it possible to purify NOx accumulated on catalyst 13, i.e., release trapped NOx from catalyst 13. Further, under the condition where the catalyst temperature is high and catalyst 13 is in a sufficiently activated condition, a rich operation is executed in a premix combustion mode. This makes it possible to prevent a deterioration of fuel consumption and protect catalyst 13 from excessive heating thereby suppressing a deterioration of catalyst 13.

It will be further understood that in a premix combustion mode that is attained by lowering the exhaust temperature and making longer the ignition delay period, a rich condition can be set by enhancing the degree of the premix combustion, thus making it possible to set a rich condition without incurring a deterioration of smoke. In addition, since there is not caused any variation of combustion between the time when the premix combustion is rich and the time when the premix combustion is lean, it becomes possible to set a rich condition of the premix combustion while suppressing a variation of combustion noise resulting at the time of switching from a rich condition to a lean condition or vice versa.

It will be further understood that for recovery of filter 14 for scavenging PM in an exhaust gas, i.e., for burning and thereby removing PM of the exhaust gas scavenged and accumulated by DPF 14, a high exhaust temperature under a condition of low oxygen concentration is required. Thus, temperature of DPF 14 is elevated under a rich condition in the diffusion combustion mode. This makes it possible to elevate the temperature of DPF 14 to a target value within a short time and reduce a deterioration of fuel consumption to a minimum.

The entire contents of Japanese Patent Application 2001-254517 are incorporated herein by reference.

Although the invention has been described above by reference to a certain embodiment of the invention, the invention is not limited to the embodiment described above. Modifications and variations of the embodiment described above will occur to those skilled in the art, in light of the above teachings. The scope of the invention is defined with reference to the following claims.

What is claimed is:

1. An exhaust gas purification system for an internal combustion engine including:
   a NOx trap catalyst disposed in an exhaust passage of the engine for trapping NOx in an inflow exhaust gas when an air/fuel ratio of the exhaust gas is lean and releasing trapped NOx when the air/fuel ratio of the exhaust gas is rich; and
   a control unit for controlling the NOx trap catalyst in accordance with an activated condition of the NOx trap catalyst;
   the control unit comprising:
      a purification time determining section for determining whether it is the time for purifying NOx trapped by the NOx trap catalyst;
      a catalyst activation determining section for determining whether the Nox trap catalyst is activated;
      a combustion mode switching section for switching a combustion mode of the engine between a diffusion combustion mode and a premix combustion mode in accordance with an operating condition of the engine; and
      an air/fuel ratio control section for controlling an exhaust air/fuel ratio so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not activate.

2. The exhaust gas purification system according to claim 1, wherein the combustion mode switching section comprises a combustion temperature control section for lowering a combustion temperature of the engine in accordance with an operating condition of the engine, and an ignition delay period control section for making considerably longer an ignition delay period during the time the combustion temperature control section is in operation so that a heat generation pattern by one of the premix combustion mode and the diffusion combustion mode is attained, the premix combustion mode being attained by the combustion temperature control section and the ignition delay period control section.

3. The exhaust gas purification system according to claim 1, further comprising a filter disposed in the exhaust passage for scavenging particulate matter (PM) in the exhaust gas, the control unit further including a recovery time determining section for determining whether it is the time for executing recovery of the filter, wherein the control unit further comprises an air/fuel ratio control section for controlling an exhaust air/fuel ratio so that the exhaust air/fuel ratio is made rich in the diffusion combustion mode when it is the time for executing recovery of the filter.

4. The exhaust gas purification system according to claim 3, wherein the filter has at least one of a catalytic function of exhibiting an oxidizing ability when placed in a lean atmosphere and a reducing ability when placed in a rich atmosphere and a catalytic function of absorbing NOx when placed in a lean atmosphere and reducing thereby purifying absorbed NOx when placed in a rich atmosphere.

5. The exhaust gas purification system according to claim 1, wherein the catalyst activation determining section has a detecting section for detecting a temperature of the NOx trap catalyst and determines whether the NOx trap catalyst is activated, based on the temperature of the NOx trap catalyst.

6. The exhaust gas purification system according to claim 1, wherein the catalyst activation determining section has an estimating section for estimating a temperature of the NOx trap catalyst and determines whether the NOx trap catalyst is activated, based on an estimated temperature of the NOx trap catalyst.

7. The exhaust gas purification system according to claim 1, wherein the air/fuel ratio control section executes a pilot injection when the exhaust air/fuel ratio is made rich in the diffusion combustion mode.

8. The exhaust gas purification system according to claim 2, further comprising an intake throttle valve and an EGR control valve of the engine, the air/fuel ratio control section controlling the exhaust air/fuel ratio by means of the intake throttle valve and the EGR control valve when the exhaust air/fuel ratio is made rich in the premix combustion mode.

9. The exhaust gas purification system according to claim 1, wherein the control unit further comprises a S-poisoning recovery time determining section for determining whether it is the time for executing recovery of the NOx trap catalyst from S-poisoning, and an air/fuel ratio control section for controlling the exhaust air/fuel ratio so that the exhaust air/fuel ratio is made rich in the diffusion combustion mode when it is the time for executing recovery of the NOx trap catalyst from S-poisoning.

10. An exhaust gas purification system for an internal combustion engine comprising:
    a NOx trap catalyst disposed in an exhaust passage of the engine for trapping NOx in an inflow exhaust gas when an air/fuel ratio of the exhaust gas is lean and releasing trapped NOx when the air/fuel ratio of the exhaust gas is rich;
    purification time determining means for determining whether it is the time for purifying NOx trapped by the NOx trap catalyst;
    catalyst activation determining means for determining whether the Nox trap catalyst is activated;
    combustion mode switching means for switching a combustion mode of the engine between a diffusion combustion mode and a premix combustion mode; and
    air/fuel ratio control means for controlling so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not activated.

11. An exhaust gas purification method for an internal combustion engine having a NOx trap catalyst disposed in an exhaust passage for trapping NOx in an inflow exhaust gas when an air/fuel ratio of the exhaust gas is lean and releasing trapped NOx when the air/fuel ratio of the exhaust gas is rich, the exhaust gas purification method comprising:
    determining whether it is the time for purifying NOx trapped by the NOx trap catalyst;
    determining whether the Nox trap catalyst is activated;
    switching a combustion mode of the engine between a diffusion combustion mode and a premix combustion mode in accordance with an operating condition of the engine; and
    controlling an exhaust air/fuel ratio so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not activated.

12. The exhaust gas purification method according to claim 11, wherein the switching of the combustion mode comprises lowering a combustion temperature of the engine in accordance with an operating condition of the engine, and making considerably longer an ignition delay period during the time the combustion temperature control section is in operation so that a heat generation pattern by one of the premix combustion mode and the diffusion combustion mode is attained, the premix combustion mode being attained by the lowering of the combustion temperature and the making considerably longer of the ignition delay period.

13. The exhaust gas purification method according to claim 11, wherein the engine further comprises a filter disposed in the exhaust passage for scavenging particulate matter (PM) in the exhaust gas, and wherein the exhaust gas purification method further comprises determining whether it is the time for executing recovery of the filter, and controlling an exhaust air/fuel ratio so that the exhaust air/fuel ratio is made rich in the diffusion combustion mode when it is the time for executing recovery of the filter.

14. The exhaust gas purification method according to claim 11, wherein the determining whether the NOx trap catalyst is activated comprises detecting a temperature of the NOx trap catalyst and determining whether the NOx trap catalyst is activated, based on the temperature of the NOx trap catalyst.

15. The exhaust gas purification method according to claim 11, wherein the determining whether the NOx trap catalyst is activated comprises estimating a temperature of the NOx trap catalyst and determining whether the NOx trap catalyst is activated, based on an estimated temperature of the NOx trap catalyst.

16. The exhaust gas purifying method according to claim 11, wherein the controlling of the exhaust air/fuel ratio comprises executing a pilot injection when the exhaust air/fuel ratio is made rich in the diffusion combustion mode.

17. The exhaust gas purifying method according to claim 12, wherein the engine further comprises an intake throttle valve and an EGR control valve, and wherein the controlling of the exhaust air/fuel ratio comprises controlling the exhaust air/fuel ratio by means of the intake throttle valve and the EGR control valve when the exhaust air/fuel ratio is made rich in the premix combustion mode.

18. The exhaust gas purification method according to claim 11, further comprises determining whether it is the time for executing recovery of the NOx trap catalyst from S-poisoning, and controlling the exhaust air/fuel ratio so that the exhaust air/fuel ratio is made rich in the diffusion combustion mode when it is the time for executing recovery of the NOx trap catalyst from S-poisoning.

19. An exhaust gas purification system for an internal combustion engine including:
a NOx trap catalyst disposed in an exhaust passage of the engine for trapping NOx in an inflow exhaust gas when an air/fuel ratio of the exhaust gas is lean and releasing trapped NOx when the air/fuel ratio of the exhaust gas is rich; and
a control unit for controlling the NOx trap catalyst in accordance with an activated condition of the NOx trap catalyst;

the control unit comprising:
a purification time determining section for determining whether it is the time for purifying NOx trapped by the NOx trap catalyst;
a catalyst activation determining section for determining whether the Nox trap catalyst is activated;
a combustion mode switching section for switching a combustion mode of the engine between a diffusion combustion mode and a premix combustion mode in accordance with an operating condition of the engine; and
an air/fuel ratio control section for controlling an exhaust air/fuel ratio so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not in activated.

20. The exhaust gas purification system according to claim 19, wherein the combustion mode switching section comprises a combustion temperature control section for lowering a combustion temperature of the engine in accordance with an operating condition of the engine, and an ignition delay period control section for making considerably longer an ignition delay period during the time the combustion temperature control section is in operation so that a heat generation pattern by one of the premix combustion mode and the diffusion combustion mode is attained, the premix combustion mode being attained by the combustion temperature control section and the ignition delay period control section.

21. The exhaust gas purification system according to claim 19, further comprising a filter disposed in the exhaust passage for scavenging particulate matter (PM) in the exhaust gas, the control unit further including a recovery time determining section for determining whether it is the time for executing recovery of the filter, wherein the control unit further comprises an air/fuel ratio control section for controlling an exhaust air/fuel ratio so that the exhaust air/fuel ratio is made rich in the diffusion combustion mode when it is the time for executing recovery of the filter.

22. The exhaust gas purification system according to claim 21, wherein the filter has at least one of a catalytic function of exhibiting an oxidizing ability when placed in a lean atmosphere and a reducing ability when placed in a rich atmosphere and a catalytic function of absorbing NOx when placed in a lean atmosphere and reducing thereby purifying absorbed NOx when placed in a rich atmosphere.

23. The exhaust gas purification system according to claim 19, wherein the activation condition determining section has a detecting or estimating section for detecting or estimating a temperature of the NOx trap catalyst and determines whether the NOx trap catalyst is activated, based on the temperature of the NOx trap catalyst.

24. The exhaust gas purification system according to claim 19, wherein the air/fuel ratio control section executes a pilot injection when the exhaust air/fuel ratio is made rich in the diffusion combustion mode.

25. The exhaust gas purification system according to claim 20, further comprising an intake throttle valve and an EGR control valve of the engine, the air/fuel ratio control section controlling the exhaust air/fuel ratio by means of the intake throttle valve and the EGR control valve when the exhaust air/fuel ratio is made rich in the premix combustion mode.

26. The exhaust gas purification system according to claim 19, wherein the control unit further comprises a S-poisoning recovery time determining section for determining whether it is the time for executing recovery of the NOx trap catalyst from S-poisoning, and an air/fuel ratio control section for controlling the exhaust air/fuel ratio so that the exhaust air/fuel ratio is made rich in the diffusion combustion mode when it is the time for executing recovery of the NOx trap catalyst from S-poisoning.

27. An exhaust gas purification system for an internal combustion engine comprising:

a NOx trap catalyst disposed in an exhaust passage of the engine for trapping NOx in an inflow exhaust gas when an air/fuel ratio of the exhaust gas is lean and releasing trapped NOx when the air/fuel ratio of the exhaust gas is rich;

purification time determining means for determining whether it is the time for purifying NOx trapped by the NOx trap catalyst;

catalyst activation determining means for determining whether the Nox trap catalyst is activated;

combustion mode switching means for switching a combustion mode of the engine between a diffusion combustion mode and a premix combustion mode; and air/fuel ratio control means for controlling so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not activated.

28. An exhaust gas purification method for an internal combustion engine having a NOx trap catalyst disposed in an exhaust passage for trapping NOx in an inflow exhaust gas when an air/fuel ratio of the exhaust gas is lean and releasing trapped NOx when the air/fuel ratio of the exhaust gas is rich, the exhaust gas purification method comprising:

determining whether it is the time for purifying NOx trapped by the NOx trap catalyst;

determining an activated condition of the Nox trap catalyst;

switching a combustion mode of the engine between a diffusion combustion mode and a premix combustion mode in accordance with an operating condition of the engine; and controlling an exhaust air/fuel ratio so that the exhaust air/fuel ratio is made rich in the premix combustion mode when it is the time for purifying trapped NOx of the NOx trap catalyst and the NOx trap catalyst is activated and that the exhaust air/fuel ratio is made rich in the diffusion combustion mode when it is the time for purifying trapped NOx of the Nox trap catalyst and the Nox trap catalyst is not activated.

29. The exhaust gas purification method according to claim 28, wherein the switching of the combustion mode comprises lowering a combustion temperature of the engine in accordance with an operating condition of the engine, and making considerably longer an ignition delay period during the time the combustion temperature control section is in operation so that a heat generation pattern by one of the premix combustion mode and the diffusion combustion mode is attained, the premix combustion being attained by the lowering of the combustion temperature and the making considerably longer of the ignition delay period.

30. The exhaust gas purification method according to claim 28, wherein the engine further comprises a filter disposed in the exhaust passage for scavenging particulate matter (PM) in the exhaust gas, and wherein the exhaust gas purification method further comprises determining whether it is the time for executing recovery of the filter, and controlling an exhaust air/fuel ratio so that the exhaust air/fuel ratio is made rich in the diffusion combustion mode when it is the time for executing recovery of the filter.

31. The exhaust gas purification method according to claim 28, wherein the determining whether the NOx trap catalyst is activated comprises detecting or estimating a temperature of the NOx trap catalyst and determining whether the NOx trap catalyst is activated, based on the temperature of the NOx trap catalyst.

32. The exhaust gas purifying method according to claim 28, wherein the controlling of the exhaust air/fuel ratio comprises executing a pilot injection when the exhaust air/fuel ratio is made rich in the diffusion combustion mode.

33. The exhaust gas purifying method according to claim 29, wherein the engine further comprises an intake throttle valve and an EGR control valve, and wherein the controlling of the exhaust air/fuel ratio comprises controlling the exhaust air/fuel ratio by means of the intake throttle valve and the EGR control valve when the exhaust air/fuel ratio is made rich in the premix combustion mode.

34. The exhaust gas purification method according to claim 28, further comprises determining whether it is the time for executing recovery of the NOx trap catalyst from S-poisoning, and controlling the exhaust air/fuel ratio so that the exhaust air/fuel ratio is made rich in the diffusion combustion mode when it is the time for executing recovery of the NOx trap catalyst from S-poisoning.

\* \* \* \* \*